United States Patent

[11] 3,613,022

[72] Inventors Lionel J. White
Kent;
Anthony Drake, Essex, both of England
[21] Appl. No. 795,835
[22] Filed Feb. 3, 1969
[45] Patented Oct. 12, 1971
[73] Assignee International Standard Electric Corporation
New York, N.Y.
[32] Priority Feb. 22, 1968
[33] Great Britain
[31] 8745/68

[54] BRANCHING CIRCUIT FOR COMPOSITE ELECTRICAL SIGNALS
4 Claims, 2 Drawing Figs.

[52] U.S. Cl. .......... 330/30 R, 307/233, 307/295, 330/31, 330/69, 330/126
[51] Int. Cl. .......... H03f 3/68
[50] Field of Search .......... 330/21, 31, 30, 30 D, 69, 126; 328/105, 167; 303/233, 295

[56] References Cited
UNITED STATES PATENTS

| | | | |
|---|---|---|---|
| 2,433,771 | 12/1947 | Lindenberg et al. .......... | 330/126 X |
| 2,589,133 | 3/1952 | Purington .......... | 330/126 |
| 2,760,011 | 8/1956 | Berry .......... | 330/126 |
| 3,249,897 | 5/1966 | Trilling .......... | 307/233 X |

*Primary Examiner*—Roy Lake
*Assistant Examiner*—James B. Mullins
*Attorneys*—C. Cornell Remsen, Jr., Walter J. Baum, Percy P. Lantzy, J. Warren Whitesel, Delbert P. Warner and James B. Raden

ABSTRACT: Branching networks comprise two filters having complementary characteristics e.g. a LP and a HP network. Only one filter network is used in the proposed arrangement. The complementary network is replaced by an active circuit using a unilateral phase splitter and a differential amplifier at the output of which only those signals appear which are blocked by the filter network. The main object of the invention is to reduce the number of coils and capacitors required. These are expensive and are not suited to printed circuit technique.

BRANCHING CIRCUIT FOR COMPOSITE ELECTRICAL SIGNALS

This invention relates to branching circuits for composite electrical signals and in particular to circuits in which an active circuit performs the function of a passive filter network.

Branching networks are used in many applications of the telecommunications art. For example they are used to divide a complex audiofrequency input signal between two loudspeakers, each handling a different part of the total frequency spectrum. They are also used in carrier-current telecommunication systems to extract from a compositive received signal a pilot signal and to retransmit the received signal without the pilot.

In such cases it is known to use a combination of filter networks having complementary transmission characteristics. Thus a low pass and a high pass or a band pass between a source of composite signal and two load circuits each accepting a different part of the input signal.

With the advent of semiconductor devices printed circuit techniques of assembly and wiring have been widely adopted in manufacture of electronic equipment. Capacitors and inductors which are the basic circuit elements from which filter networks are built up do not fit in well with this technique due to their relatively large size. Capacitors and inductors, particularly when adjusted to close tolerances are also expensive. For this reason it is desirable to reduce the number of these components to a minimum.

According to the invention there is provided a branching circuit for composite electrical signals comprising connected to a source of said signals a unilateral phase-splitting circuit, a filter network and a differential amplifier, a first output signal from the phase splitter being applied to the input of the filter and to an input of the differential amplifier, the second output from the phase splitter, of opposite phase to the first, being applied to the other input of the differential amplifier, the branching circuit providing a first branched signal at the output terminals of the filter for signal components falling within the pass band of said filter and a second branched signal at the output of the differential amplifier for signal components falling within the stop band of the filter.

Figure 1:
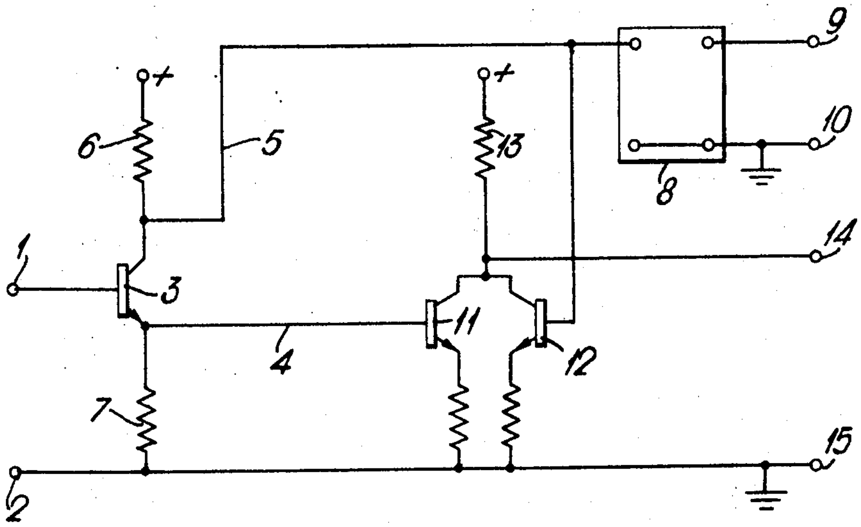
Figure 2:
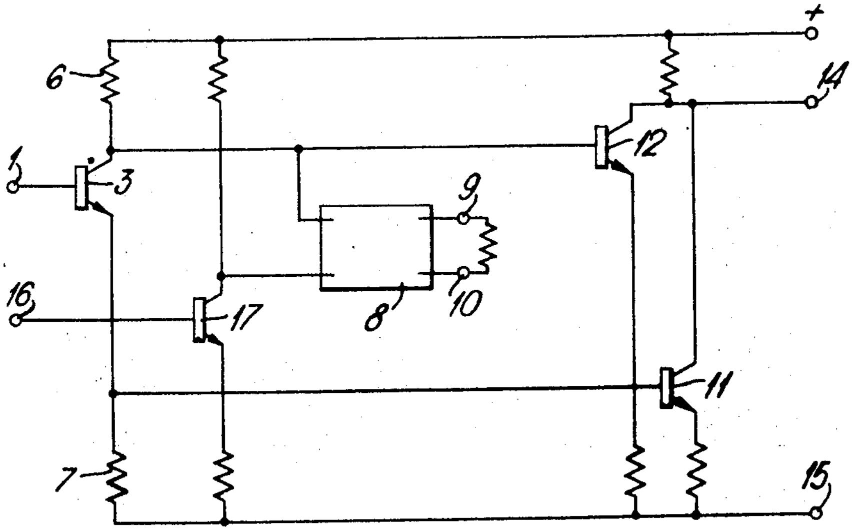

The invention will now be described with reference to the accompanying drawings in which:

FIG. 1 shows a simplified schematic of a circuit according to an embodiment of the invention and FIG. 2 shows a modification of the circuit of FIG. 1.

In the circuit of FIG. 1, which for clarity does not show biasing or coupling elements, the composite input signal from a source, not shown, is applied via terminals 1 and 2 to the base-emitter circuit of transistor 3, which performs the duty of a unilateral phase splitter and produces an output signal which is substantially in phase with the input signal on lead 4 and a further output signal on lead 5 which is in phase opposition to the first output signal. The magnitude of these signals is adjusted to the required value by the choice of resistors 6 and 7. If the source of input signal requires termination, a suitable resistor may be connected across terminals 1 and 2.

Lead 5 takes one of the phase splitter outputs to a filter network 8 which might have any desired characteristic. As an example it will be assumed that the filter is a low-pass filter. Any frequency components of the input signal applied to the phase splitter which fall within the pass band of the filter will thus appear at output terminals 9 and 10.

The two outputs of the phase splitter are applied to the base electrodes of transistors 11 and 12 forming a differential amplifier. Terminals 14 and 15 are connected to the output of the differential amplifier.

The advantage of using a differential amplifier having a load resistor which is common to the collector circuits of both transistors and separate resistors in the emitter circuits over the more conventional long-tailed pair circuit is that the former circuit provides less interaction between the two input signals due to the negative feedback provided by the emitter resistors.

Assuming that the load circuit connected to terminals 9 and 10 provides a suitable termination for the filter 8, its input impedance will be resistive and of value $Z_o$ for signals falling within the pass band of the filter. The value of resistors 6 and 7 of the phase splitter can therefore be so chosen that the two input signals applied to the differential amplifier have equal amplitudes and opposite phases. There will therefore be no output signal across terminals 14 and 15.

For frequency components not passed by filter 8 its input impedance is reactive and depending on its circuit will be either high or low compared to its characteristic impedance. The magnitude and phase of the signal on lead 5 will therefore no longer equal to that of signal on lead 4. These frequency components will therefore appear across the common-collector resistor 13 of the differential amplifier and the output terminals 14 and 15.

From the above it is seen that all signals rejected at the input of filter 8 appear at terminals 14 and 15 and conversely all signals passed by the filter 8 do not appear at terminals 14 and 15. The active circuit comprising transistors 3, 11 and 12 are thus performing the function of a filter network having transmission characteristics which are complementary to that of filter 8 i.e. a high-pass filter in the example considered. If filter 8 were a band-pass filter, the output at terminals 14 and 15 would be that corresponding to a band-stop filter.

The input and both outputs of the branching circuit of FIG. 1 are unbalanced relative to ground. If it is required to handle a balanced to ground input signal, it is known to use balancing input and/or output transformers for the purpose. A preferred arrangement in which a balanced-to-ground input signal is accepted without the use of a balancing transformer is shown in FIG. 2. In this figure, where applicable, the reference of FIG. 1 are used. One of the input terminals 16 is no longer connected to ground but to the base electrode of a buffer amplifier using transistor 17. The balanced-to-ground filter network 8 is connected to the collector circuits of transistors 3 and 17 and provides a balanced output signal at terminals 9 and 10. If it is required to provide a balanced-to-ground signal at the output from the differential amplifier, a phase splitter can be connected to terminals 14 and 15.

The described circuits are not limited to the use of NPN transistors as shown. PNP transistors or valves can be used to give the same results. Neither is the circuit limited to the use of phase splitters and differential amplifiers shown in FIG. 1 and 2. Known alternative phase splitting circuits, for example a long-tailed pair circuit can be used.

We claim:

1. A branching circuit for composite audiofrequency signals comprising a unilateral phase-splitting circuit connected to a source of said signal, a filter network and a differential amplifier, a first output signal from the phase-splitting circuit being applied to the input of the filter network and to an input of the differential amplifier, the second output from the phase-splitting circuit, of opposite phase to the first, being applied to the other input of the differential amplifier, the branching circuit providing a first branched signal at the output terminals of the filter network for signal components falling within the pass band of said filter network and a second branched signal at the output of the differential amplifier for signal components falling within the stop band of the filter network.

2. A circuit as claimed in claim 1 in which the phase-splitting circuit comprises a single transistor circuit to the base of which the composite input signal is applied and the two antiphase output signals are derived from the emitter and collector circuits respectively, the output which is applied to the filter network and to the first input of the differential amplifier being taken from the collector circuit.

3. A circuit as claimed in claim 2 in which the differential amplifier comprises two transistors to the base electrodes of which the two input signals are applied, the output signal being obtained from a load resistor which is common to the collector circuits of both transistors, the emitter circuit of each transistor including a separate resistor to provide negative feedback.

4. A circuit as claimed in claim 3 in which the signals applied to the two inputs of the differential amplifier are of equal magnitude and of opposite phase when their frequency falls within the pass band of the filter, but are unequal in magnitude and/or not in opposite phase when their frequency falls within the stop band of the filter network.